United States Patent
Davis et al.

(10) Patent No.: US 11,203,188 B2
(45) Date of Patent: Dec. 21, 2021

(54) MULTILAYERED POLYMERIC FILM

(71) Applicant: Ampacet Corporation, Tarrytown, NY (US)

(72) Inventors: Don Davis, Mason, OH (US); Danny Nevins, Mason, OH (US); Tom Mickey, Mason, OH (US); Mark McManus, Mason, OH (US); Doug Brownfield, Mason, OH (US); Linda Carroll, Mason, OH (US)

(73) Assignee: Ampacet Corporation, Tarrytown, NY (US)

( * ) Notice: Subject to any disclaimer, the term of this patent is extended or adjusted under 35 U.S.C. 154(b) by 75 days.

(21) Appl. No.: 16/075,728

(22) PCT Filed: May 3, 2016

(86) PCT No.: PCT/US2016/030553
§ 371 (c)(1),
(2) Date: Aug. 6, 2018

(87) PCT Pub. No.: WO2017/138968
PCT Pub. Date: Aug. 17, 2017

(65) Prior Publication Data
US 2019/0054720 A1 Feb. 21, 2019

Related U.S. Application Data

(60) Provisional application No. 62/294,516, filed on Feb. 12, 2016.

(51) Int. Cl.
| | |
|---|---|
| B32B 27/08 | (2006.01) |
| B32B 5/18 | (2006.01) |
| B32B 27/20 | (2006.01) |
| B32B 27/32 | (2006.01) |
| B32B 27/18 | (2006.01) |
| B32B 27/06 | (2006.01) |
| B32B 5/14 | (2006.01) |
| C08J 9/06 | (2006.01) |
| C08J 9/10 | (2006.01) |

(52) U.S. Cl.
CPC .............. *B32B 27/08* (2013.01); *B32B 5/145* (2013.01); *B32B 5/18* (2013.01); *B32B 27/065* (2013.01); *B32B 27/18* (2013.01); *B32B 27/20* (2013.01); *B32B 27/32* (2013.01); *B32B 27/327* (2013.01); *B32B 2250/02* (2013.01); *B32B 2250/03* (2013.01); *B32B 2250/04* (2013.01); *B32B 2250/05* (2013.01); *B32B 2250/246* (2013.01); *B32B 2266/025* (2013.01); *B32B 2307/406* (2013.01); *B32B 2307/409* (2013.01); *B32B 2307/4026* (2013.01); *B32B 2451/00* (2013.01); *C08J 9/06* (2013.01); *C08J 9/102* (2013.01); *C08J 9/105* (2013.01); *C08J 9/107* (2013.01); *C08J 2323/06* (2013.01)

(58) Field of Classification Search
None
See application file for complete search history.

(56) References Cited

U.S. PATENT DOCUMENTS

| | | |
|---|---|---|
| 4,303,716 A | 12/1981 | Eshbach et al. |
| 7,820,282 B2 | 10/2010 | Haas et al. |
| 8,163,810 B2 | 4/2012 | Howie et al. |
| 8,859,091 B2 | 10/2014 | Tadros et al. |
| 8,908,129 B2 | 12/2014 | Sriraman et al. |
| 2003/0232210 A1* | 12/2003 | Haas ................ B41M 5/508 428/500 |
| 2005/0147807 A1 | 7/2005 | Haas et al. |
| 2005/0282000 A1 | 12/2005 | Howie, Jr. |
| 2009/0305030 A1 | 12/2009 | Sriraman et al. |
| 2009/0317649 A1* | 12/2009 | Smith ................ B32B 27/08 428/516 |
| 2019/0054720 A1 | 2/2019 | Davis et al. |

FOREIGN PATENT DOCUMENTS

| | | |
|---|---|---|
| AR | 104511 A1 | 7/2017 |
| BR | 112018016399 | 12/2018 |
| CA | 3013271 A1 | 8/2017 |
| CN | 105216410 | 1/2016 |
| CN | 108698364 A | 10/2018 |
| EA | 201891820 A1 | 1/2019 |
| EP | 0304482 B1 | 8/1992 |
| EP | 3414088 A1 | 12/2018 |
| IL | 260928 | 10/2018 |
| JP | 54-117540 A | 9/1979 |
| JP | 59-104996 U | 7/1984 |
| JP | 61-020319 A | 1/1986 |
| JP | 01-502333 A | 8/1989 |
| JP | 03-096331 A | 4/1991 |
| JP | 2005-530632 A1 | 10/2005 |
| JP | 2008-503367 A | 2/2008 |
| JP | 2010-076217 A | 4/2010 |

(Continued)

OTHER PUBLICATIONS

Search report and written opinion issued by the Intellectual Property Office of Singapore dated Aug. 13, 2019; 8 pages.
International Preliminary Report on Patentability received for PCT Patent Application No. PCT/US2016/030553, dated Aug. 23, 2018, 6 pages.
International Search Report and Written Opinion received for PCT Patent Application No. PCT/US2016/030553, dated Aug. 5, 2016, 6 pages.

(Continued)

*Primary Examiner* — Laura C Powers
(74) *Attorney, Agent, or Firm* — Smith, Gambrell & Russell LLP

(57) ABSTRACT

Disclosed are compositions and methods for creating a textured or patterned surface on elastomeric extruded film.

10 Claims, No Drawings

(56) References Cited

FOREIGN PATENT DOCUMENTS

| JP | 2019-511405 A | 4/2019 |
|---|---|---|
| KR | 2018-0103963 A | 9/2018 |
| MX | 2018009760 A | 11/2018 |
| SG | 11201806259V | 8/2018 |
| WO | 198806520 | 9/1988 |
| WO | 1988006520 A1 | 9/1988 |
| WO | 2017/138968 A1 | 8/2017 |

OTHER PUBLICATIONS

Notice of Grounds For Rejection received for Korean Patent Application No. 10-2018-7022994, dated May 22, 2020, 9 pages (5 pages of English Translation and 4 pages of Original Document).
An Office Action issued by the Indian Patent Office dated Jul. 14, 2020 for the corresponding Indian application; 5 pages.
An Office Action issued by the Korean Patent Office dated May 22, 2020 for the corresponding Korean patent application; 5 pages.
First Office Action received for Chinese Application No. 201680081413, dated Feb. 28, 2020, 8 pages (5 pages of English Translation and 3 pages of Original Document).
Notice of Final Rejection received for Korean Application No. 10-2018-7022994, dated Nov. 19, 2020, 7 pages (4 pages of English Translation and 3 pages of Original Document).
Search Report Received for Chinese Patent Application No. 201680081413, dated Feb. 24, 2020, 1 page.
Second Office Action received for Chinese Application No. 201680081413, dated Nov. 4, 2020, 8 pages (5 pages of English Translation and 3 pages of Original Document).
Supplementary Search Report received for Chinese Application No. 201680081413, dated Oct. 29, 2020, 1 page.
Decision of Refusal received for Japanese Patent Application No. 2018-561178, dated Jul. 30, 2020, 6 pages (3 pages of English Translation and 3 pages of Original Document).
European Search Report and Search Opinion Received for EP Application No. 16890081, dated Aug. 9, 2019, 6 pages.
Notice of Reasons for Refusal received for Japanese Patent Application No. 2018-561178, dated Nov. 28, 2019, 8 pages (4 pages of English Translation and 4 pages of Original Document).
Notification of Reason for Refusal received for Korean Application No. 10-2018-7022994, dated Nov. 28, 2019, 7 pages (4 pages of English Translation and 3 pages of Original Document).
Search Report received for Japanese Patent Application No. 2018-561178, dated Nov. 29, 2019, 15 pages (8 pages of English Translation and 7 pages of Original Document).
European Communication pursuant to Article 94(3) EPC received for European Patent Application No. 16890081, dated Aug. 17, 2020, 4 pages.
Communication Pursuant to Article 94(3) EPC received in corresponding European application EP 16890081.9, dated May 28, 2021 (4 pages).
Office Action received in corresponding Chinese application CN 201680081413.4, dated May 24, 2021 (3 pages), with English Translation (4 pages).
Office Action received in corresponding Eurasian application EA 201891820, dated May 20, 2021 (2 pages) with English Translation (2 pages).

\* cited by examiner

MULTILAYERED POLYMERIC FILM

I. BACKGROUND

1. Traditionally, elastomeric extruded film has been limited to a smooth outer layer surface. Attempts have been made to create a disrupted pattern in the outer surface but have not been consistently successful. Today, extruded elastomeric film has to go through a secondary converting process to emboss the outer layer surface of the film to create texture or a disrupted pattern.

2. The elastomeric film industry is looking for process methods to eliminate the need for secondary processing to create a textured or patterned surface on elastomeric extruded film. Industry demand is for a technology to allow for a film surface to create texture or pattern effect on a consistent lot to lot basis during the initial extrusion process.

II. SUMMARY

3. Disclosed are methods and compositions related to a multilayered polymeric film with a visual effect produced by the particular ordered combination of the polymeric layers (such as, for example, REPTYLEFX by Ampacet Corp.).

4. In one aspect disclosed herein are multilayered polymeric films comprising first polymeric layer comprising a foaming agent and a second layer comprising a polymeric resin and a special effect agent; wherein the special effect reflects through the first layer to create a multi-dimensional, textured color effect; and wherein the foaming agent of the first layer is on the side of the first layer opposite to the second layer.

IV. DETAILED DESCRIPTION

6. Before the present compounds, compositions, articles, devices, and/or methods are disclosed and described, it is to be understood that they are not limited to specific synthetic methods or specific recombinant biotechnology methods unless otherwise specified, or to particular reagents unless otherwise specified, as such may, of course, vary. It is also to be understood that the terminology used herein is for the purpose of describing particular embodiments only and is not intended to be limiting.

A. Definitions

7. As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

8. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

9. In this specification and in the claims which follow, reference will be made to a number of terms which shall be defined to have the following meanings:

10. "Optional" or "optionally" means that the subsequently described event or circumstance may or may not occur, and that the description includes instances where said event or circumstance occurs and instances where it does not.

11. Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

B. Compositions

12. Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular multilayered polymeric film is disclosed and discussed and a number of modifications that can be made to the film are discussed, specifically contemplated is each and every combination and permutation of the components of the multilayered polymeric film and the modifications that are possible unless specifically indicated to the contrary. Thus, if a class of components A, B, and C are disclosed as well as a class of components D, E, and F and an example of a combination of the components, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-F would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

13. The present disclosure relates to the creation of visual and textured effects through the use of multilayered polymeric films, special effects, and foaming agents. In one aspect, disclosed herein are multilayered polymeric film comprising first polymeric layer comprising a foaming agent and a second layer comprising a polymeric resin and a special effect agent; wherein the special effect reflects through the first layer to create a multi-dimensional, textured color effect; and wherein the foaming agent of the first layer is on the side of the first layer opposite to the second layer (such as, for example, with REPTYLEFX by Ampacet Corp.)

14. It is understood and herein contemplated that the polymeric layers comprise, amongst other things a polymeric resin. Resins suitable for the present invention are polyolefins which may include low density polyethylene (LDPE), linear low density polyethylene (LLDPE), high density polyethylene (HDPE), medium density polyethylene (MDPE), ultra high molecular weight polyethylene (UHMWPE), cross-linked polyethylene (XLPE), polypropylene (PP) polymers, and metallocene catalyzed polyolefin (i.e. plastomer) resins. The resins of the present invention may either be homopolymers or copolymers. Examples of the latter are olefin-copolymers such as polyethylene butylacrylate, polyethylene methacrylate and polyethylene vinyl acetate.

15. Because the disclosed film comprises multiple polymeric layers, it is understood, that that the polymeric composition of each layer can contribute to the visual and textural effects given to the film as well as the other physical attributes of the film given the intended use of the film. Accordingly, the composition of each layer of the multilayered polymeric film can be different or the same as any one or more additional layers. In one aspect, each layer of the multilayered polymeric film can comprise the same or different polyolefin resins. For example, in one aspect, disclosed herein are multilayered polymeric films wherein all polymeric layers low density polyethylene (LDPE), linear low density polyethylene (LLDPE), or high density polyethylene (HDPE). In another example, the disclosed multilayered polymeric films can comprise one or more polymeric layers comprising low density polyethylene (LDPE), linear low density polyethylene (LLDPE), or high density polyethylene (HDPE) and at least one polymeric layer wherein the polymer comprises a different polymer structure.

16. While in its simplest form the multilayered polymeric film comprises two layers. However, it is fully contemplated herein that the multilayered polymeric film can comprise 1, 2, 3, 4, 5, 6, 7, 8, 9, 10, 11, 12, 13, 14, 15, 16, 17, 18, 29, 20, 25, 30, 35, 40, 45, or 50 or more additional polymer layers. Thus, in one aspect, disclosed herein are multilayered polymeric films comprising 2, 3, 4, 5, 6, 7, 8, 9, or 10 or more layers. For example, disclosed herein are multilayered polymeric films further comprising a third polymeric layer adjacent to the second layer and on the opposite side from the first layer. Any subsequent layer being added to the proceeding layer and not to the face of the first layer comprising the foaming agent.

17. It is understood and herein contemplated that the individual polymeric layers can comprise the same or different portion of the multilayered polymeric film and that the ratio of individual layers can be modified to achieve different visual effects. For example each layer of a two layered film can comprise 50% of the film. Alternatively, one polymeric layer of a two layered polymeric film can comprise 1, 2,3,4, 5,6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 percent of the multilayered film while the remaining layer comprises the remaining percentage of the multilayered film. Similarly, in a three layered film each layer can comprise the same portion (i.e., a ⅓ portion) of the film structure or be differently proportioned such that at most two of the layers comprise the same amount of the film while the remaining layer comprise a different portion. For example, it is disclosed herein that the first (i.e., the outer) layer and the third layer (inner layer) can each comprise 20% of the multilayered film (a total of 40%) while the second (middle or core layer) comprises the remaining 60% of the film. That is, any combination of layer ratios can exist in the multilayered film, including, but not limited to, an outer:middle:inner percentage of 5:90:5; 10:80:10; 15:70:15; 20:60:20; 25:50:25; 30:40:30; 35:30:35; 40:20:40; 45:10:45; 5:5:90; 10:10:80; 15:15:70; 20:20:60; 25:25:50; 30:30:40; 35:35:30; 40:40:20; 45:45:10; 90:5:5; 80:10:10; 70:15:15; 60:20:20; 50:25:25; 40:30:30; 30:35:35; 20:40:40; 10:45:45; 5:10:85; 10:15:75; 15:20:65; 20:25:55; 25:35:45; 10:5:85; 15:10:75; 20:15:65; 25:20:55; 30:25:45; 85:10:5; 75:15:10; 65:20:15; 55:25:20; 45:30:25; 85:5:10; 75:10:15; 65:15:20; 55:20:25; 45:25:30; 5:85:10; 10:75:15; 15:65:20; 20:55:25; 25:45:30; 10:85:5; 15:75:10; 20:65:15; 25:55:20; or 30:45:25 or any other combination.

18. A variety of foaming agents may be utilized for incorporation into the first polymeric layer. The first (i.e., outer) layer comprises the foaming agent to achieve the visual and/or textural effects. For example, Azo compounds, N'-nitroso compounds and sulfonyl hydrazide compounds can be used as foaming agents. Furthermore, mixtures of these groups of compounds may also be used herein. Typical usage levels of the foaming agent range from 1% to 2% in the outer layer of the film structure, but the percentage of foaming agent used can be modified depending on the degree of texture of visual effect desired. Examples of azo compounds that can be used in the disclosed multilayered polymeric films include, but are not limited to azodicarbonamide, azobisisobutyronitrile, and diazoaminobenzene. Among the nitroso compounds, examples of compounds that can be used in the disclosed multilayered polymeric films include, but are not limited to N,N'-dimethyl, N,N'-dinitrosoterephthalamide, and N,N'-dinitrosopentamethylenetetramine. Examples of foaming agents falling under the genus of sulfonyl hydrazides include, but are not limited to benzenesulfonyl hydrazide, toluene-(4)-sulfonyl hydrazide, benzene-1,3-disulfonylhydrazide, diphenylsulfon-3,3'-disulfonyl hydrazide, and 4,4'oxybis(benezenesulfonyl hydrazide). Mixtures of any of the above foaming agents may also be used.

19. Inorganic carbonates may also be suitable as constituents of foaming agents. Examples include sodium bicarbonate, sodium aluminum hydroxyl carbonate, magnesium carbonate and mixtures thereof. Polycarboxylic acids are also useful. These include citric acid, fumaric acid, tartaric acid, sodium hydrogen citrate and disodium citrate as well as mixtures of carbonates and acids.

20. In some embodiments, an activator may be included to assist the activity of the foaming agent. Suitable for this purpose are zinc oxide, dibasic lead phthalate, ethylene glycol and urea and derivatives thereof (e.g. hydroxyethyl urea). These activators may be formulated in amounts from about 0.1 to about 15%, preferably from about 0.5 to about 7%, optimally from about 1 to about 3% by weight of the foaming agent.

21. To achieve the visual effect, the disclosed multilayered films comprise a special effect agent. It is understood and herein contemplated that the visual effect occurs via the visual perception of special effect in any one or more polymer layers interacting with the texture and residue left by the foaming agent in the first layer. For example, the special effect agent in the second layer reflects through the cellular structure in the outer layer creating a unique dimensional film effect.

22. As used herein, "special effect agent" refers to any agent that can create a visual effect, including but not limited to colored pigments, pearlescent pigments, light interference pigments, or other special effect pigments. Special effect agents can be incorporated into any layer of the multilayered polymeric film. For example, disclosed herein are 3-layered multilayered polymeric films wherein the second and third layers comprise a special effect agent. Also disclosed are 3-layered multilayered polymeric films wherein all three layers comprise a special effect.

What is claimed is:

1. A multilayered polymeric film comprising:
   an outer polymeric layer comprising a foaming agent and an inner polymeric layer comprising a polymeric resin and a special effect agent, wherein
   the foaming agent in the outer polymeric layer produces a cellular structure at a side of the outer polymeric layer that is opposite the inner polymeric layer,
   the special effect agent in the inner polymeric layer reflects through the cellular structure in the outer polymeric layer to create a multi-dimensional visual effect, and
   the foaming agent comprises azo compounds, N'-nitroso compounds, sulfonyl hydrazide compounds, inorganic carbonates, polycarboxylic acids, or mixtures thereof.

2. The multilayered polymeric film of claim 1, wherein the special effect agent is a colored pigment, pearlescent pigment, light interference pigment or other special effect metallic pigment.

3. The multilayered polymeric film of claim 1, wherein the outer polymeric layer comprises polyolefin polymers.

4. The multilayered polymeric film of claim 3, wherein the polyolefin polymer of the outer polymeric layer comprises low density polyethylene (LDPE), linear low density polyethylene (LLDPE), high density polyethylene (HDPE) medium density polyethylene (MDPE), ultra high molecular weight polyethylene(UHMWPE), cross-linked polyethylene (XLPE), or polypropylene (PP) polymers.

5. A multilayered polymeric film comprising:
   an outer polymeric layer comprising a foaming agent and a first special effect agent, a middle polymeric layer comprising a polymeric resin, and an inner polymeric layer comprising a polymeric resin, wherein
   the foaming agent in the outer polymeric layer produces a cellular structure at a side of the outer polymeric layer that is opposite the inner polymeric layer,
   at least one of the middle and inner polymeric layers comprises a second special effect agent different from the first special effect agent,
   the second special effect agent reflects through the cellular structure in the outer polymeric layer to create a multi-dimensional visual effect in combination with the first special effect agent, and
   the foaming agent comprises azo compounds, N'-nitroso compounds, sulfonyl hydrazide compounds, inorganic carbonates, polycarboxylic acids, or mixtures thereof.

6. The multilayered polymeric film of claim 5, wherein the proportion of the layers in the three-layered film structure is 20% the outer polymeric layer; 60% the middle polymeric layer; 20% the inner polymeric layer.

7. The multilayered polymeric film of claim 5, wherein the second special effect agent is a colored pigment, pearlescent pigment, or light interference pigment different from the first special effect agent.

8. The multilayered polymeric film of claim 1, wherein the outer polymeric layer is the outermost layer of the multilayered polymeric film, and the cellular structure produced by the foaming agent presents an exposed textured surface in the multilayered polymeric film.

9. The multilayered polymeric film of claim 1, wherein the outer polymeric layer comprises a special effect agent.

10. The multilayered polymeric film of claim 5, wherein the outer polymeric layer is the outermost layer of the multilayered polymeric film, and the cellular structure produced by the foaming agent presents an exposed textured surface in the multilayered polymeric film.

* * * * *